Dec. 31, 1935.    T. TERAOKA    2,026,290
WEIGHING SCALE
Filed April 8, 1933    2 Sheets-Sheet 1
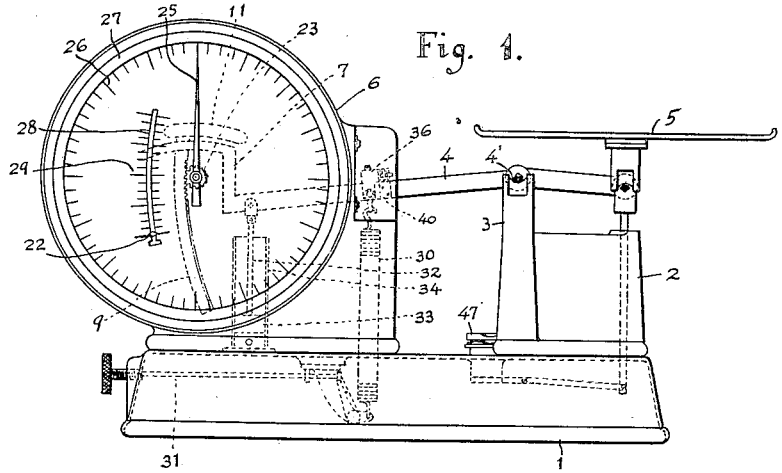
Fig. 1.
Fig. 3.
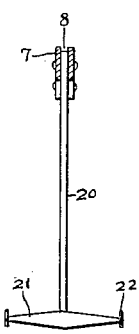
Fig. 2.
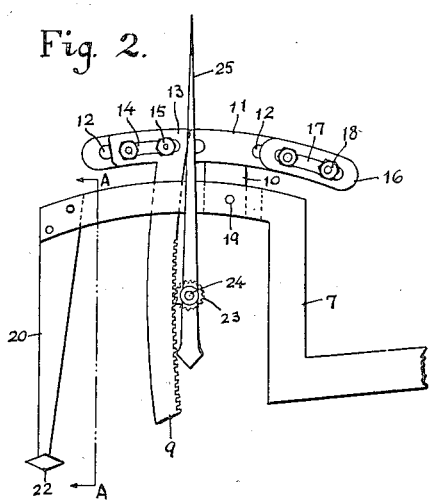
INVENTOR.
T. Teraoka
BY
E. F. Wenderoth
ATTORNEY.

Dec. 31, 1935.  T. TERAOKA  2,026,290

WEIGHING SCALE

Filed April 8, 1933  2 Sheets-Sheet 2

INVENTOR.
T. Teraoka
BY
ATTORNEY.

Patented Dec. 31, 1935

2,026,290

UNITED STATES PATENT OFFICE 2,026,290

WEIGHING SCALE

Toyoharu Teraoka, Shinagawa-ku, Tokyo, Japan, assignor to Kabushiki Kaisha Asahi Koki Seisakusho, Tokyo, Japan Application April 8, 1933, Serial No. 665,221

7 Claims. (Cl. 265—68)

This invention relates to automatic balances or weighing machines having a rack and pinion device for turning pointers to indicate the graduations of weight on suitable dials. In the ordinary machine of this type the said rack and pinion, which constitute a most important part of the machine, mesh with too much pressure, thereby giving rise to undue friction, and producing attendant wear on their teeth and giving rise to an inaccuracy in the pointer indications on the dial graduations.

A most important feature of the present invention consists in the improvement of the rack and pinion device, wherein friction has been substantially avoided; the rack is constantly in mesh with the pinion, since the rack is mounted independently on a lever according to the principle of a body in constant equilibrium.

The main object of my invention is to provide weighing machines of this character which can be constructed simply and, consequently, economically, affording the precise and correct measurement of a given weight without causing any trouble over a long period of use. By my invention I have avoided the aforesaid defects which attend the ordinary machines, by improving the contact device of said rack and pinion mechanism, in combination with other contrivances. According to my invention the rack is formed as a piece which is curved instead of straight, the centre of said rack being at the axis of the balance lever, and being made adjustable as concerns its contact with the pinion, this being brought about by designing the balance weight to slide along the arc member, thereby causing the rack to move reciprocally up and down, and meshing firmly yet very lightly with the pinion, thereby placing but little load on the pinion, because the rack of my invention is mounted on the balance lever in accordance with the principle of a body in stable equilibrium. In other words, the curved rack and pinion are kept constantly in firm yet very light mesh, notwithstanding the ascending or descending position of the curved rack due to the up and down reciprocating motion of the same. It is therefore substantially antifrictional with respect to the pinion, and consequently it does not give rise to any trouble resulting from wrong indications of the pointers, due in most cases to wear of the gear. Another feature of my invention is that it has been constructed so that the main pointer can make as many revolutions around the dial as the machine has been previously designed for in cooperation with an auxiliary pointer on the same dial. The said auxiliary pointer serves to indicate the number of revolutions the main pointer makes. In other words, the main pointer indicates the smaller units of weight, while the auxiliary pointer serves for indicating larger units which exceed the units assigned for a complete revolution of the main pointer. For example, if one revolution of the main pointer along the circumferential graduation on the dial is to be 1,500 grammes, and a substance weighing more than 3,000 grammes is to be measured, the main pointer will make two revolutions, while the auxiliary pointer points out the graduation of 3,000 grammes, the remainder or fractional units, as for instance thirty grammes, being indicated by the main pointer. The actual weight of said substance, that is, 3,030 grammes, will therefore be ascertained by reading both graduations indicated by the said two pointers. Still another feature is that a device to adjust the position of the spring has been provided.

Various other features and advantages of my invention will appear from the following description of one form thereof and from the accompanying drawings, in which:

Fig. 1 is a front view of the automatic weighing machine embodying my invention.

Fig. 2 is a detailed elevation showing the adjustable gear contact device, comprising a curved rack pivoted near one end of the balance lever and meshed with a pinion on the shaft of which is secured the main pointer.

Fig. 3 is a side view cut along the line A—A in Fig. 2, showing the auxiliary pointer.

Figure 4:
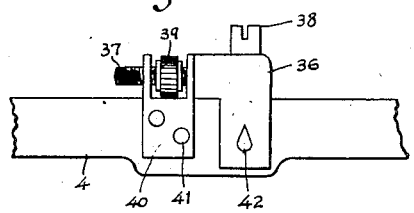
Fig. 4 is a side view of a device for adjusting the spring of Fig. 1.

In Figs. 1 to 3, a bed 1 is provided upon which is firmly mounted a triangular housing 2 having therein two cooperating supporting posts 3. A balance lever 4 is shown, which rests on said posts 3 through a beam (not shown) crossing the lever, 4' being the fulcrums thereof. Any substance to be weighed will be placed on a scale pan 5 provided therefor. The said scale pan is pivotally mounted on the lever through any convenient frame work, though such a structure has been omitted in the drawings for the sake of simplicity. The other end of said lever 4 is extended into a dial housing 6 through a slot (not shown) provided in the said housing. The left hand end portion 7 of the lever 4 is first bent upwardly and is then bent outwardly again in the form of an arc as shown, the said arc portion being bifurcated to form a slit 8 through which a curved rack 9, projecting downwardly from the curved arc member 11, is moved vertically. The said arc member 11 has a projection 10 vertically projecting downwardly from substantially the middle thereof, and the bottom portion of said projection is inserted into the slit 8 and is pivoted to the arc of the left hand end portion 7 by a pin 19. The arc member 11 is provided with slots 12 in both its right and left arms. The said curved rack 9 is inwardly saw-toothed to mesh with a pinion gear, and the top portion has a projection 13 turned to the left, with a slot 14. The rack 9 is adjustably connected with said arc member on the left arm thereof, preferably by means of two sets of nuts and screws 15, said screws passing through both slots 12 and 14. On the other arm of said arc member a weight 16 is movably fitted by means of a nut and screw 18, the said screw passing through slots 12 and 17, as with the left hand arm. The said weight is preferably formed in configuration with the arm of said arc member so as to have said slot 17 over the slot 12. The curved rack 9 depends from the member 11, as has been mentioned before, and passes through the slit 8 (Fig. 3) of the arc portion of the lever and meshes with a pinion 23. A main pointer 25 is fixed on a shaft 24 of the pinion 23, which is geared with the rack 9. The said pointer is to traverse graduations 26 provided along the circumferential portion of a dial 27 attached either to one side or to both the front and back sides of the housing 6. The said graduations 26 serve to show the smaller units of weight. The vertical member 20 has an enlarged portion 21 at its lower end, the said portion having one or two auxiliary pointers 22, as the case may be, either at its front end or at both its front and back ends. Each of the said auxiliary pointers projects outwardly through a curved slot 28 provided in the dial 27 at a position near the centre of the dial, and traverses graduations 29 provided along the edge of said slot 28, the said graduations serving to show the larger units of weight, as has been already mentioned. A spring 30 is enclosed in the housing 6. The spring acts to pull the left hand portion of the lever 4 downwardly, and may preferably be made of any proper metal that has a strong resiliency and which is but little affected by temperature change.

Figure 5:
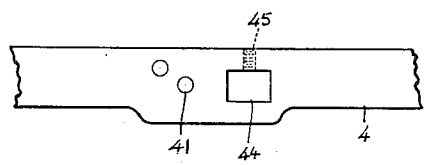
Fig. 5 is a like view of the balance lever of Fig. 1, showing the point at which the said device of Fig. 4 is to be mounted.
Figure 6:
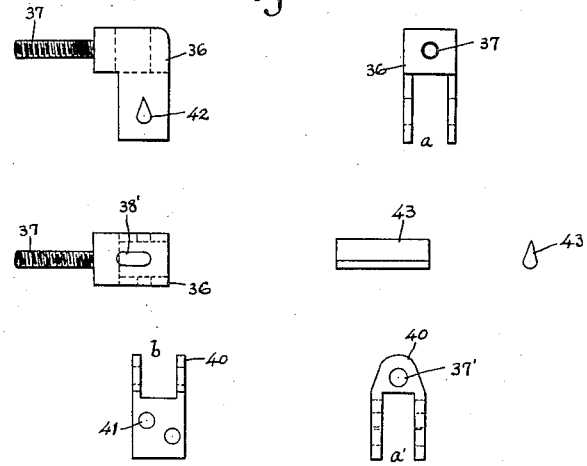
Fig. 6 shows details of elements forming part of said adjusting device of Fig. 4.

In the present machine a thumb screw 31 with a long leg is provided at the lower part of the machine. By screwing the said long leg in and out toward the foot of the spring, the tension of the same is adjusted, and consequently the main pointer is correctly adjusted so that it will always stay at the zero indication when not in use. The lower end of the spring is secured in a known manner through a connecting link, as can be seen in the drawings. However the upper end of the said spring is fixed slidably on the lever 4 through a novel means as shown in Figs. 4, 5, and 6. The said means comprises a block 36 with a groove sufficiently wide to fit onto the lever, with a threaded rod 37 longitudinally extending to the left and a block 40 somewhat saddle-shaped with a groove $a'$ similar to the groove $a$, and a groove $b$ at the top. Said two blocks are joined by passing said rod 37 through perforations 37' provided in both walls 40 of the groove and by interposing at the same time a thumb nut 39 between the walls. This assembly is saddled upon the portion of the lever 6 (Fig. 5). The block 36 is then slidably fixed to the lever by means of a knife-edged pin 43 which passes through the perforations 42 as well as through an opening 44 provided in the lever. The shape and cross-section of said perforations 42 are substantially the same as that of the pin 43 so that they may fit tightly, while the opening 44 is sufficiently large to allow the said pin to slide to the right or left. The other block 40 is fixed stationary to the lever by pinning at places 41. A screw 38 is provided at the top of the block 36, the lower end of the same passing into the lever 4. The knife-edged pin 43 projects on both sides at some length, and on said projections is fitted a ring to which a hook of the spring 30 is hung. This adjusting device permits altering the position of the spring. In operation the screw 38 is forced out a little and the thumb nut 39 is turned backwards or forwards. The block 36 will then slide on the lever 4 until the pin 42 strikes the wall of the opening 44. In fact, a very small adjustment will effect the tension of the spring; consequently the pointers on the dial are properly checked. When the tension of the spring and the motion of the pointers are fixed correctly the screw 38 is then forced down firmly into the threaded hole 45.

While I have described the preferred embodiment of my invention, it will be evident to those skilled in this art that various modifications may be made without departing from the spirit of my invention. For example the indication with the auxiliary needle may be made somewhat attractive by coloring the points appearing on the dial. I intend by the appended claims to cover modifications falling within the scope of my invention.

What I claim as new and desire to secure by Letters Patent is:—

1. Automatic balances or weighing machines, comprising a balance lever, a curved rack, a pinion meshed with said curved rack, a shaft for said pinion, an indicator on said shaft, a dial the face of which is traversed by the indicator, an elongated member separate from the lever, from which the rack is dependingly connected, and a short vertical projection depending at approximately right angles from said elongated member and pivotally connected to said balance lever adjacent one end of the latter, as a result of which pivoted connection the rack is yieldably and gravity pressed towards said pinion, while undue friction is avoided between the rack and pinion, movement of the rack by the lever giving rise to rotation of the pinion and arcuate movement of the indicator across the dial.

2. Automatic balances or weighing machines, comprising a balance lever, a curved rack, a pinion meshed with said curved rack, a shaft for said pinion, an indicator on said shaft, a spring attached to said balance lever to pull the same downwardly, means for adjusting the tension of said spring, to maintain said indicator at zero when not in use, a dial the face of which is traversed by the indicator, an elongated member separate from the lever, from which the rack is dependingly connected, and a short vertical projection depending at approximately right angles from said elongated member and pivotally connected to said balance lever adjacent one end of the latter, as a result of which pivoted connection the rack is yieldably and gravity pressed towards said piston, while undue friction is avoided between the rack and pinion, movement of the rack by the lever giving rise to rotation of the pinion and arcuate movement of the indicator across the dial.

3. A weighing machine, comprising a balance lever, an elongated member separate from and extending along the lever, a curved rack dependingly and adjustably connected to said elongated member near one end of the latter, a counterweight adjustably secured to the elongated member near the other end of the latter, a pinion meshing with said rack, a shaft for said pinion, an indicator on said shaft, a casing for said machine, a dial on said casing the face of which dial is traversed by the indicator, a short vertical projection depending at approximately right angles from said elongated member and pivotally connected to said balance lever adjacent one end thereof, as a result of which pivoted connection the rack is yieldably and gravity pressed toward said pinion, while undue friction is avoided between the rack and pinion, movement of the rack by the lever giving rise to rotation of the pinion and arcuate movement of the indicator across the dial, and a second indicator fixed to and depending from that end of the balance lever adjacent the dial, the second indicator carrying a pointer cooperating with a second scale on the dial, the second scale being so calibrated with respect to the pinion that for each complete revolution of the pinion the latter the second indicator will traverse a predetermined number of indications of the second scale.

4. A weighing machine, comprising a balance lever, an elongated member separate from and extending along the lever, a curved rack dependingly connected to said elongated member near one end of the latter, a pinion meshing with said rack, a shaft for said pinion, an indicator on said shaft, a casing for said machine, a dial on said casing the face of which dial is traversed by the indicator, a short vertical projection depending at approximately right angles from said elongated member and pivotally connected to said balance lever adjacent one end thereof, as a result of which pivoted connection the rack is yieldably and gravity pressed towards said pinion, while undue friction is avoided between the rack and pinion, movement of the rack by the lever giving rise to rotation of the pinion and arcuate movement of the indicator across the dial, and a second indicator fixed to and depending from that end of the balance lever adjacent the dial, the second indicator carrying a pointer cooperating with a second scale on the dial, the second scale' being so calibrated with respect to the pinion that for each complete revolution of the latter the second indicator will traverse a predetermined number of indications of the second scale.

5. A weighing machine, comprising a balance lever, an elongated member separate from and extending along the lever, a curved rack dependingly and adjustably connected to said elongated member near one end of the latter, a counterweight adjustably secured to the elongated member near the other end of the latter, a pinion meshing with said rack, a shaft for said pinion, an indicator on said shaft, a casing for said machine, a dial on said casing the face of which dial is traversed by the indicator, and a short vertical projection depending at approximately right angles from said elongated member and pivotally connected to said balance lever adjacent one end thereof, as a result of which pivoted connection the rack is yieldingly and gravity pressed towards said pinion, while undue friction is avoided between the rack and pinion, movement of the rack by the lever giving rise to rotation of the pinion and arcuate movement of the indicator across the dial.

6. A weighing machine, comprising a balance lever, a curved rack, a pinion meshed with said curved rack, a shaft for said pinion, and indicator on said shaft, a block saddled on and pinned to said lever near its midpoint, perforated ears upstanding on said block, a second block saddled on said lever and having a threaded arm extending through the perforations in the ears in the first block, a thumb nut on said arm between said ears, a knife edged pin extending through said second block and loosely through a hole in said lever, a spring attached at one end to said knife edges to pull the lever downwardly, movement of the thumb nut changing the zero position of the lever, a dial the face of which is traversed by the indicator, an elongated member separate from the lever, from which the rack is dependingly connected, and a short vertical projection depending at approximately right angles from said elongated member and pivotally connected to said balance lever adjacent one end of the latter, as a result of which pivoted connection the rack is yieldably and gravity pressed towards said pinion, while undue friction is avoided between the rack and pinion, movement of the rack by the lever giving rise to rotation of the pinion and arcuate movement of the indicator across the dial.

7. A weighing machine, comprising a balance lever, a curved rack, a pinion meshed with said curved rack, a shaft for said pinion, an indicator on said shaft, a block saddled on and pinned to said lever near its midpoint, perforated ears upstanding on said block, a second block saddled on said lever and having a threaded arm extending through the perforations in the ears in the first block, a thumb nut on said arm between said ears, a knife edged pin extending through said second block and loosely through a hole in said lever, a spring attached at one end to said knife edges to pull the lever downwardly, a pivoted lever one end of which is secured to the other end of the spring, a rod extending to the exterior and secured to the other end of the lever, movement of either the rod or the thumb nut changing the zero position of the lever, a dial the face of which is traversed by the indicator, an elongated member separate from the lever, from which the rack is dependingly connected, and a short vertical projection depending at approximately right angles from said elongated member and pivotally connected to said balance lever adjacent one end of the latter, as a result of which pivoted connection the rack is yieldably and gravity pressed towards said pinion, while undue friction is avoided between the rack and pinion, movement of the rack by the lever giving rise to rotation of the pinion and arcuate movement of the indicator across the dial.

TOYOHARU TERAOKA.